(12) United States Patent
Sunkara et al.

(10) Patent No.: US 7,531,593 B2
(45) Date of Patent: *May 12, 2009

(54) THERMOPLASTIC ELASTOMER BLEND COMPOSITION

(75) Inventors: Hari Babu Sunkara, Hockessin, DE (US); Herbert Vernon Bendler, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/590,565

(22) Filed: Oct. 31, 2006

(65) Prior Publication Data

US 2008/0103243 A1    May 1, 2008

(51) Int. Cl.
*C08K 3/10*    (2006.01)

(52) U.S. Cl. ............... 524/436; 525/236.1; 525/327.4; 525/327.5; 525/460; 525/461; 525/462

(58) Field of Classification Search ............. 525/327.4, 525/327.5, 460, 461, 462, 236.1; 524/436
See application file for complete search history.

(56) References Cited

U.S. PATENT DOCUMENTS

| | | | |
|---|---|---|---|
| 3,896,078 A | 7/1975 | Hoeschele | |
| 4,275,180 A | 6/1981 | Clarke | |
| 4,659,757 A | 4/1987 | Okamoto et al. | |
| 4,981,908 A | 1/1991 | Wolfe, Jr. | |
| 5,015,789 A | 5/1991 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 5,962,745 A | 10/1999 | Brossmer et al. | |
| 6,140,543 A | 10/2000 | Brossmer et al. | |
| 6,232,511 B1 | 5/2001 | Haas et al. | |
| 6,235,948 B1 | 5/2001 | Sunkara et al. | |
| 6,277,289 B1 | 8/2001 | Kurian et al. | |
| 6,297,408 B1 | 10/2001 | Haas et al. | |
| 6,331,264 B1 | 12/2001 | Kurian et al. | |
| 6,342,646 B1 | 1/2002 | Haas et al. | |
| 6,720,459 B2 | 4/2004 | Sunkara et al. | |
| 6,977,291 B2 | 12/2005 | Sunkara et al. | |
| 7,038,092 B2 | 5/2006 | Sunkara et al. | |
| 7,244,790 B2 * | 7/2007 | Sunkara et al. ......... | 525/327.4 |
| 2002/0004568 A1 | 1/2002 | Cohen et al. | |
| 2004/0030095 A1 | 2/2004 | Sunkara et al. | |
| 2004/0115450 A1 | 6/2004 | Bendler et al. | |
| 2004/0225161 A1 | 11/2004 | Sunkara et al. | |
| 2004/0225162 A1 | 11/2004 | Sunkara et al. | |
| 2004/0260125 A1 | 12/2004 | Seapan et al. | |
| 2005/0020775 A1 | 1/2005 | Wu et al. | |
| 2005/0020805 A1 | 1/2005 | Sunkara et al. | |
| 2005/0069997 A1 | 3/2005 | Adkesson et al. | |
| 2005/0282966 A1 | 12/2005 | Sunkara et al. | |
| 2006/0247380 A1 | 11/2006 | Sunkara et al. | |

FOREIGN PATENT DOCUMENTS

EP    0 337 976 B1    10/1989
FR    2387262 A    11/1978

OTHER PUBLICATIONS

J. Buffle, et al., "Source Apportionment of Atmospheric Particles—Environmental Particles" vol. 1 of the IVPAC Environmental Analytical Chemistry Series, Lewis Publishers (1992), pp. 3-74.

Hsieh, "Division S-3—Soil Microbiology and Biochemistry", Soil Science Society of America, vol. 56, Mar.-Apr. 1992, No. 2, pp. 460-464.

Chou, et al., "High Flexibility EMA Made from High Pressure Tubular Process", Annual Technical Conference—Society of Plastics Engineers, 60th, vol. 2 (2002), pp. 1832-1836.

International Search Report dated Mar. 14, 2008, International Application No. PCT/US2007/022987.

\* cited by examiner

*Primary Examiner*—Peter Szekely

(57) ABSTRACT

This invention relates to thermoplastic elastomer compositions comprising blends of polyether ester elastomers and crosslinkable poly(meth)acrylate rubbers, and the manufacture and use thereof in, for example, shaped or molded rubber articles.

20 Claims, No Drawings

THERMOPLASTIC ELASTOMER BLEND COMPOSITION

FIELD OF THE INVENTION

This invention relates to thermoplastic elastomer compositions comprising blends of polyether ester elastomers and crosslinkable poly(meth)acrylate rubbers, and the manufacture and use thereof in, for example, shaped or molded rubber articles.

BACKGROUND OF THE INVENTION

For many applications in the petroleum and automotive industries there is a need for elastomeric materials with good oil resistance at elevated temperatures and also good mechanical properties at sub-ambient temperatures. There is a particular need for materials that are flexible and soft (low in hardness) with good resistance to heat and compression set.

It is generally known in the art to employ curable polyacrylate elastomers to manufacture high performance rubber parts having excellent resistance to lubricating oils and greases which are therefore useful in selected automotive applications and the like. The gum rubber vulcanizates are either polyacrylate elastomers derived from copolymerization of acrylic acid ester monomers (e.g., ethyl, butyl, and methoxyethyl acrylate and can include some vinyl acetate), polyethylene/acrylate elastomer derived from copolymerization of ethylene monomer and acrylic acid ester monomers (e.g. ethylene and methyl acrylate and can include other comonomers and grafts, see for example US2002-0004568A1), or polyperfluoroalkyl acrylate elastomer derived from polymerization of fluorinated acrylic ester monomer (e.g., 1,1 dihydroperfluoro-n-butyl acrylate). The polyacrylate elastomers also can be functionalized by incorporating a relatively small amount of an additional comonomer such as an acrylate glycidyl ester, maleic acid or other comonomer having a reactive group including acid, hydroxyl, epoxy, isocyanate, amine, oxazoline, chloroacetate or diene. These functionalized polyacrylate elastomers can then be cured using a curative co-agent containing functional groups that covalently bond to the functionalized reactive sites of the polyacrylate elastomer.

One problem associated with the prior art curable polyacrylate elastomers is the inherent rheological limitations of the high viscosity and low melt flow of their cured or partially cured state. Consequently, physical blending followed by compression molding and subsequent curing is usually necessary to achieve acceptable properties rather than extrusion or injection molding directly to a finished part (as discussed above). However, in EP-A-0337976 and U.S. Pat. No. 4,981,908, thermoplastic elastomer compositions are disclosed comprising blends of polyester resin (including segmented polyether ester elastomers commercially available under the trademark HYTREL® (E. I. du Pont de Nemours and Company, Wilmington, Del.)) and dynamically vulcanized, covalently cross-linked acrylate rubber (including ethylene/methyl acrylate terpolymer containing about one mole percent of a carboxylic acid containing comonomer, commercially available under the trademark VAMAC® (E. I. du Pont de Nemours and Company, Wilmington, Del.)). The covalent cross-linking in these disclosures is achieved by employing a functionalized polyacrylate elastomer in combination with reactive difunctional cross-linking agent. However, almost all of these difunctional cross-linking agents can also react with the ester units in the polyalkylene phthalates (i.e., an amine, hydroxyl or carboxylic acid group will exchange with the ester groups and epoxy or acid groups will add to the hydroxyl end groups), which leads to high viscosity and lack of reproducibility.

In US2004-0115450A1, there is disclosed a curable thermoplastic elastomeric blend comprising a polyalkylene phthalate polyester polymer or copolymer and a crosslinkable poly(meth)acrylate or ethylene/(meth)acrylate copolymer vulcanizate rubber in combination with a peroxide free-radical initiator and an organic multiolefinic coagent to crosslink the rubber during extrusion or injection molding of the blend. It is taught there that the polyester hard segment blocks in the copolymer should have high melt temperatures to obtain useful elastomeric blends for high temperature service. However, it is generally found that hard segment high melt temperatures increase polymer hardness and reduce flexibility.

Commonly owned U.S. application Ser. No. 11/120,056 (filed May 2, 2005, and entitled Thermoplastic Elastomer Blend, Method of Manufacture and Use Thereof) discloses curable thermoplastic elastomeric compositions comprising: (a) polytrimethylene ether ester elastomer; (b) crosslinkable poly(meth)acrylate rubber; and (c) a crosslinking system to crosslink the rubber. In particular, excellent properties were obtained from compositions comprising crosslinkable poly (meth)acrylate rubber and block copolymer comprising poly (trimethylene ether) terephthalate soft segment and poly(butylene terephthalate).

Polyether ester thermoplastic elastomers comprising polytrimethylene ether ester soft segments, in particular polytrimethylene ether terephthalate, and polyethylene ester hard segments, in particular polyethylene terephthalate, have also been described US2005-0282966A1. These materials have a potential advantage for use in compositions containing poly (meth)acrylate rubbers because the melting point and thermal stability of the polyethylene terephthalate hard segments is higher than those of the hard segments based on tetramethylene or trimethylene esters. Their utility, however, is limited in these uses because of the relatively low rates of crystallization of polyethylene terephthalate. Low crystallization rates in the compositions used for making shaped articles would mean that the article could continue to crystallize when in service with concomitant volume changes.

It would, therefore, be desirable to find a means for utilizing these thermoplastic elastomers based on polyethylene terephthalate hard segments in curable elastomer blends such as disclosed in the aforementioned Commonly owned U.S. Application Serial No. 11/120,056 (filed May 2, 2005, and entitled Thermoplastic Elastomer Blend, Method of Manufacture and Use Thereof).

SUMMARY OF THE INVENTION

The present invention has addressed this desire by providing a curable thermoplastic elastomeric composition comprising: (a) a polyether ester elastomer having a polytrimethylene ether ester soft segment and a polyethylene ester hard segment; (b) a nucleating agent selected from the group consisting of an alkali metal salt, an alkaline earth metal salt and mixtures thereof; (c) a crosslinkable poly(meth)acrylate rubber; and (d) a crosslinking system to crosslink the rubber.

In another embodiment, the invention relates to a melt processable thermoplastic elastomeric composition comprising: (a) a continuous phase comprising: (i) polyether ester elastomer having a polytrimethylene ether ester soft segment and a polyethylene ester hard segment, and (ii) a nucleating agent; and (b) a crosslinked poly(meth)acrylate rubber disperse phase.

The present invention also relates to shaped articles made from the composition, in particular hoses, gaskets, films, belts, cable jackets, seals, gears and bearings.

In yet another embodiment the invention is directed to a process for manufacturing a melt processable thermoplastic elastomeric composition comprising the steps of:

(a) providing a cross-linkable poly(meth)acrylate rubber, a crosslinking system in an amount effective to crosslink the poly(meth)acrylate rubber, a polyether ester elastomer having a polytrimethylene ether ester soft segment and a polyethylene ester hard segment, and nucleating agent in an amount effective to lower the crystallization time of the polyether ester elastomer;

(b) forming a mixture of the cross-linkable poly(meth) acrylate rubber, the polyether ester elastomer, the nucleating agent and the crosslinking system;

(c) cross-linking the cross-linkable poly(meth)acrylate rubber in the mixture using the crosslinking system; and (d) recovering the melt processable thermoplastic elastomeric composition comprising the polyether ester elastomer and nucleating agent as a continuous phase and the crosslinked poly(meth)acrylate rubber as a disperse phase.

In a preferable aspect of this embodiment, the crosslinking is carried out during extrusion or injection molding of the melt processable thermoplastic elastomeric composition.

DETAILED DESCRIPTION OF THE PREFERRED EMBODIMENTS

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

In describing and/or claiming this invention, the term "copolymer" is used to refer to polymers containing two or more monomers. The use of the term "terpolymer" and/or "termonomer" means that the copolymer has at least three different comonomers. The term "(meth)acrylic acid" refers to methacrylic acid and/or acrylic acid, inclusively. Likewise, the terms "(meth)acrylate" and "alkyl (meth)acrylate" are used interchangeably herein and mean methacrylate and/or acrylate esters. "Poly(meth)acrylate" means polymers derived from the polymerization of either or a mixture of both corresponding type of monomers. The term "vulcanizate" and the phrase "vulcanizate rubber" as used herein are intended to be generic to the cured or partially cured, cross-linked or cross-linkable rubber as well as curable precursors of cross-linked rubber and as such include elastomers, gum rubbers and so-called soft vulcanizates as commonly recognized in the art. The use of the phrase "organic multi-olefinic co-agent" is intended to mean organic co-agents that contain two or more olefinic double bonds. The phrase "rubber phase" and "thermoplastic phase" as used herein refer to and mean the polymeric morphological phases present in the resulting thermoplastic elastomeric blends derived from mixing and dynamic crosslinking of the cross-linkable (meth) acrylate rubber and the polyether ester starting materials, according to the method of the present invention. Likewise, the term "elastomer" is used herein to describe not only essentially amorphous materials, but also soft, partially-crystalline materials (often referred to as plastomers) which, in the case of ethylene copolymers, can contain as little as 6.5 mole % comonomer.

The curable thermoplastic elastomer blends according to the present invention are preferably prepared by the mixing of (a) a polytrimethylene ether ester elastomer based on a polytrimethylene ether ester soft segment and a polyethylene ester hard segment; (b) a nucleating agent; (c) a poly(meth)acrylate rubber; and (d) a crosslinking system for the poly(meth) acrylate rubber. More specifically, the crosslinking system preferably involves the combination of a free-radical initiator and an organic multiolefinic co-agent. The use of the free-radical initiator and multiolefinic co-agent results in a curable thermoplastic blend that can be dynamically cross-linked during melt blending and/or melt fabrication. Thus the curable thermoplastic elastomer blend is extruded, injection molded or the like and the free-radical initiator and multi-olefinic co-agent acts as a curative agent/system resulting in cross-linking of the rubber, in situ, within the blend.

Preferably the compositions of the invention comprise from about 15 to about 75 wt % polytrimethylene ether ester elastomer and from about 25 to about 85 wt % poly(meth) acrylate rubber, based on the combined weight of the elastomer and the rubber.

The resulting dynamically cross-linked product according to the invention will itself be a melt processable thermoplastic elastomer composition. As such, the cross-linked product will be thermoformable and recyclable. Typically the resulting melt processable thermoplastic elastomer will be more thermoplastic than its component rubber phase in the absence of the thermoplastic polyester phase and will be more elastic than the thermoplastic polyester phase in the absence of the rubber phase. Furthermore, the resulting melt processable thermoplastic elastomer composition will involve the polyether ester elastomer being present as a continuous phase while the cross-linked poly(meth)acrylate or ethylene/alkyl (meth)acrylate copolymer rubber will be present as the dispersed phase.

Polyether Ester Elastomer

The polyether ester elastomer preferably comprises from about 10 to about 90 wt %, more preferably from about 20 to about 80 wt %, and still more preferably from about 30 to about 70 wt %, polytrimethylene ether ester soft segment; and from about 10 to about 90 wt %, more preferably from about 20 to about 80 wt %, and still more preferably from about 30 to about 70 wt %, polyethylene ester hard segment, based on the weight of the polyether ester elastomer.

The polyether ester elastomer preferably has an inherent viscosity of at least about 0.6 dl/g, more preferably at least about 1.0 dl/g, and preferably up to about 2.4 dl/g, more preferably up to about 1.9 dl/g.

The terms "polytrimethylene ether ester soft segment" and "soft segment" are used in connection with the present invention to refer to the reaction product of a polymeric ether glycol and a "dicarboxylic acid equivalent", via ester linkage, wherein at least about 50 wt %, more preferably at least about 85 wt %, and still more preferably from about 95 to 100 wt %, of the polymeric ether glycol used to form the soft segment is a polytrimethylene ether glycol ("PO3G").

"Polyethylene ester hard segment" and "hard segment" are used in connection with the present invention to refer to the reaction product of one or more diols and one or more dicarboxylic acid equivalents, via ester linkage, wherein greater than about 50 mole %, more preferably at least about 75 mole %, even more preferably at least about 85 mole %, and still more preferably from about 95 to 100 mole %, of the diol used to form the hard segment is ethylene glycol.

By "dicarboxylic acid equivalent" is meant dicarboxylic acids and their equivalents, which are compounds that perform substantially like dicarboxylic acids in reaction with polymeric glycols and diols, as would be generally recognized by a person of ordinary skill in the relevant art. In addition to dicarboxylic acids, dicarboxylic acid equivalents for the purpose of the present invention include, for example, mono- and diesters of dicarboxylic acids, and diester-forming derivatives such as acid halides (e.g., acid chlorides) and anhydrides.

Polymeric Ether Glycol for Soft Segment

PO3G for the purposes of the present invention is an oligomic and/or polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, thus resulting in polymers or copolymers containing —($CH_2CH_2CH_2O$)— linkage (e.g, trimethylene ether repeating units).

In addition to the trimethylene ether units, lesser amounts of other units, such as other polyalkylene ether repeating units, may be present. In the context of this disclosure, the term "polytrimethylene ether glycol" encompasses PO3G made from essentially pure 1,3-propanediol, as well as those oligomers and polymers (including those described below) containing up to 50% by weight of comonomers.

The 1,3-propanediol employed for preparing the PO3G may be obtained by any of the various well known chemical routes or by biochemical transformation routes. Preferred routes are described in, for example, U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 6,235,948, 6,277,289, 6,297,408, 6,331,264, 6,342,646, 7,038,092, US20040225161A1, US20040260125A1, US20040225162A1 and US20050069997A1.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacllus*. The technique is disclosed in several publications, including previously incorporated U.S. Pat. Nos. 5,633,362, 5,686,276 and 5,821,092. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The PO3G and elastomers based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions of the present invention can be characterized as more natural and having less environmental impact than similar compositions comprising petroleum based glycols.

The biologically-derived 1,3-propanediol, and PO3G and elastomers based thereon, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t = (-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2\times10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\text{‰}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic finger-printing, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in previously incorporated U.S. Pat. No. 7,038,092, US2004-0260125A1, US2004-0225161A1 and US2005-0069997A1, as well as PO3G made therefrom as disclosed in US2005-0020805A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having L*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably about 99% by weight or more 1,3-propanediol, based on the weight of the 1,3-propanediol reactant.

PO3G can be made via a number of processes known in the art, such as disclosed in U.S. Pat. Nos. 6,977,291 and 6,720,459. A preferred process is as set forth in previously incorporated US2005-0020805A1.

As indicated above, PO3G may contain lesser amounts of other polyalkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Suitable comonomer polyols include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$-$C_{10}$ diols (such as 1,6-hexanediol, 1,8-octanediol and 1,10-decanediol) and isosorbide, and mixtures thereof. Particularly preferred diols other than 1,3-propanediol include ethylene glycol, 2-methyl-1,3-propanediol and $C_6$-$C_{10}$ diols.

One preferred PO3G containing comonomers is poly(trimethylene-ethylene ether) glycol such as described in US2004-0030095A1. Preferred poly(trimethylene-ethylene ether) glycols are prepared by acid catalyzed polycondensation of from greater than 50 to about 99 mole % (preferably from about 60 to about 98 mole %, and more preferably from about 70 to about 98 mole %) 1,3-propanediol, and up to 50 to about 1 mole % (preferably from about 40 to about 2 mole %, and more preferably from about 30 to about 2 mole %) ethylene glycol.

Preferably, the PO3G after purification has essentially no acid catalyst end groups, but may contain very low levels of unsaturated end groups, predominately allyl end groups, in the range of from about 0.003 to about 0.03 meq/g. Such a PO3G can be considered to comprise (consist essentially of) the compounds having the following formulae (II) and (III):

HO—((CH$_2$)$_3$O)$_m$—H     (II)

HO—((CH$_2$)$_3$—O)$_m$CH$_2$CH═CH$_2$     (III)

wherein m is in a range such that the Mn (number average molecular weight) is within the range of from about 200 to about 5000, with compounds of formula (III) being present in an amount such that the allyl end groups (preferably all unsaturation ends or end groups) are present in the range of from about 0.003 to about 0.03 meq/g. The small number of allyl end groups in the PO3G are useful to control elastomer molecular weight, while not unduly restricting it, so that compositions ideally suited, for example, for fiber end-uses can be prepared.

The preferred PO3G for use in the invention has an Mn of at least about 250, more preferably at least about 1000, and still more preferably at least about 2000. The Mn is preferably less than about 5000, more preferably less than about 4000, and still more preferably less than about 3500. Blends of PO3Gs can also be used. For example, the PO3G can comprise a blend of a higher and a lower molecular weight PO3G, preferably wherein the higher molecular weight PO3G has a number average molecular weight of from about 1000 to about 5000, and the lower molecular weight PO3G has a number average molecular weight of from about 200 to about 950. The Mn of the blended PO3G will preferably still be in the ranges mentioned above.

PO3G preferred for use herein is typically a polydisperse polymer having a polydispersity (i.e. Mw/Mn) of preferably from about 1.0 to about 2.2, more preferably from about 1.2 to about 2.2, and still more preferably from about 1.5 to about 2.1. The polydispersity can be adjusted by using blends of PO3G.

PO3G for use in the present invention preferably has a color value of less than about 100 APHA, and more preferably less than about 50 APHA.

When a PO3G based substantially on 1,3-propanediol is used to form the soft segment, the soft segment can be represented as comprising units represented by the following structure:

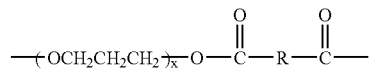

wherein R represents a divalent radical remaining after removal of carboxyl functionalities from a dicarboxylic acid equivalent, and x is a whole number representing the number of trimethylene ether units in the PO3G.

The polymeric ether glycol used to prepare the polytrimethylene ether ester soft segment of the polyether ester may also include up to 50 wt % of a polymeric ether glycol other than PO3G. Preferred such other polymeric ether glycols include, for example, polyethylene ether glycol, polypropylene ether glycol, polytetramethylene ether glycol, polyhexamethylene ether glycol, copolymers of tetrahydrofuran and 3-alkyl tetrahydrofuran, and mixtures thereof.

Polyethylene Ester Hard Segment

The polyethylene ester hard segment can be represented as comprising units having the following structure:

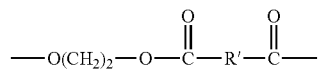

wherein R' represents a divalent radical remaining after removal of carboxyl functionalities from a dicarboxylic acid equivalent. In most cases, the dicarboxylic acid equivalents used to prepare the soft segment and the hard segment of the polyether ester of this invention will be the same.

The hard segment can also be prepared with less than 50 mole %, preferably up to about 25 mole %, more preferably up to about 15 mole %, and still more preferably up to about 5 mole %, of diols other than ethylene glycol, preferably having a molecular weight lower than about 400. The other diols are preferably aliphatic diols and can be acyclic or cyclic. Preferred are diols with 3-15 carbon atoms such as trimethylene, tetramethylene, isobutylene, butylene, pentamethylene, 2,2-dimethyltrimethylene, 2-methyltrimethylene, hexamethylene and decamethylene glycols; dihydroxy cyclohexane; cyclohexane dimethanol; and hydroquinone bis(2-hydroxyethyl) ether. More preferred are aliphatic diols containing 3-8 carbon atoms, especially 1,3-propanediol (trimethylene glycol) and/or 1,4-butanediol (tetramethylene glycol). Two or more other diols can be used.

Dicarboxylic Acid Equivalent

The dicarboxylic acid equivalent can be aromatic, aliphatic or cycloaliphatic. In this regard, "aromatic dicarboxylic acid equivalents" are dicarboxylic acid equivalents in which each carboxyl group is attached to a carbon atom in a benzene ring system such as those mentioned below. "Aliphatic dicarboxylic acid equivalents" are dicarboxylic acid equivalents in which each carboxyl group is attached to a fully saturated carbon atom or to a carbon atom which is part of an olefinic double bond. If the carbon atom is in a ring, the equivalent is "cycloaliphatic." The dicarboxylic acid equivalent can contain any substituent groups or combinations thereof, so long as the substituent groups do not interfere with the polymerization reaction or adversely affect the properties of the polyether ester product.

Preferred are the dicarboxylic acid equivalents selected from the group consisting of dicarboxylic acids and diesters of dicarboxylic acids. More preferred are dimethyl esters of dicarboxylic acids.

Preferred are the aromatic dicarboxylic acids or diesters by themselves, or with small amounts of aliphatic or cycloaliphatic dicarboxylic acids or diesters. Especially preferred are the dimethyl esters of aromatic dicarboxylic acids.

Representative aromatic dicarboxylic acids useful in the present invention include terephthalic acid, isophthalic acid, bibenzoic acid, naphthalic acid, substituted dicarboxylic compounds with benzene nuclei such as bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, and C1-C10 alkyl and other ring substitution derivatives such as halo, alkoxy or aryl derivatives. Hydroxy acids such as p-(hydroxyethoxy)benzoic acid can also be used providing an aromatic dicarboxylic acid is also present. Representative aliphatic and cycloaliphatic dicarboxylic acids useful in this invention are sebacic acid, 1,3- or 1,4-cyclohexane dicarboxylic acid, adipic acid, dodecanedioic acid, glutaric acid, succinic acid, oxalic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethyl succinic acid, cyclopentanenedicarboxylic acid, decahydro-1,5- (or 2,6-)naphthalene dicarboxylic acid, 4,4'-bicyclohexyl dicarboxylic acid, 4,4'methylenebis(cyclohexylcarboxylic acid), 3,4-furan dicarboxylate, and 1,1-cyclobutane dicarboxylate. The dicarboxylic acid equivalents in the form of diesters, acid halides and anhydrides of the aforementioned aliphatic dicarboxylic acids are also useful to provide the polyether ester of the present invention. Representative aromatic diesters include dimethyl terephthalate, bibenzoate, isophthlate, phthalate and naphthalate.

Of the above, preferred are terephthalic, bibenzoic, isophthalic and naphthalic acid; dimethyl terephthalate, bibenzoate, isophthlate, naphthalate and phthalate; and mixtures thereof. Particularly preferred dicarboxylic acid equivalents are the equivalents of phenylene dicarboxylic acids especially those selected from the group consisting of terephthalic and isophthalic acid and their diesters, especially the dimethyl esters, dimethyl terephthalate and dimethyl isophthalate. In addition, two or more dicarboxylic acids equivalents can be used. For instance, terephthalic acid and/or dimethyl terephthalate can be used with small amounts of the other dicarboxylic acid equivalents.

In a preferred embodiment, at least about 70 mole % (more preferably at least about 80 mole %, still more preferably at least about 90 mole %, and still more preferably from about 95 to 100 mole %) of the dicarboxylic acid equivalent is terephthalic acid and/or dimethyl terephthalate.

Process of Making Polyether Esters

The polyether ester is preferably prepared by providing and reacting (a) a PO3G, (b) ethylene glycol and (c) a dicarboxylic acid equivalent. The other glycols, diols, etc., as described above are can also be provided and reacted.

The polyether ester of this invention is conveniently made starting with a conventional ester exchange reaction, esterification or transesterification depending on the starting dicarboxylic acid equivalent. For example, dimethyl terephthalate is heated with polytrimethylene ether glycol and an excess of ethylene glycol in the presence of a catalyst at 150-250° C., while distilling off the methanol formed by the ester exchange. This reaction is typically performed at a pressure of about 1 atmosphere. The reaction product, referred to herein as "precondensation product", is a mixture of the ester exchange reaction products of the dimethyl terephthalate and the polytrimethylene ether glycol and ethylene glycol, primarily bis(hydroxyethyl) terephthalate with varying amounts of (hydroxy-polytrimethylene ether) terephthalates, along with a small amount of the corresponding oligomers. This precondensation product mixture then undergoes polymerization or polycondensation to a copolymer of an elastomeric polyether ester with a polytrimethylene ether glycol soft segment and a polyethylene terephthalate hard segment (condensation product of ethylene glycol and dimethyl terephthalate). The polymerization (polycondensation) involves additional ester exchange and distillation to remove the diol to increase molecular weight. The polycondensation is typically performed under vacuum. Pressure is typically in the range of from about 0.01 to about 18 mm Hg (1.3 to 2400 Pa), preferably in the range of from about 0.05 to about 4 mm Hg (6.7 to 553 Pa), and more preferably from about 0.05 to about 2 mm Hg. The polycondensation is typically carried out at a temperature in the range of from about 220° C. to about 290° C.

The precondensation (ester exchange) and polymerization steps may involve alternative processes to those described above. For example, polytrimethylene ether glycol can be reacted with polydimethylene ester (e.g., polyethylene terephthalate) in the presence of catalyst (such as those described for the ester exchange, preferably the titanium catalysts such as tetrabutyl titanate) until randomization occurs. Both processes result in block copolymers.

To avoid excessive residence time at high temperatures and possible accompanying thermal degradation, a catalyst can be (and preferably is) employed in the ester exchange. Catalysts useful in the ester exchange process include organic and inorganic compounds of titanium, lanthanum, tin, antimony, zirconium, manganese, zinc, phosphorus and mixtures thereof. Manganese acetate is a preferred transesterification catalyst and antimony trioxide is a preferred polycondensation catalyst. Titanium catalysts, such as tetraisopropyl titanate and tetrabutyl titanate, are also preferred and are added in an amount of at least about 25 ppm (preferably at least about 50 ppm and more preferably at least about 100 ppm) and up to about 1000 ppm (preferably up to about 500 ppm and more preferably up to about 400 ppm) titanium by weight, based on the weight of the finished polymer. Additional catalyst may be added after ester exchange or direct esterification reaction and prior to polymerization.

Ester exchange polymerizations are generally conducted in the melt without added solvent, but inert solvents can be added to facilitate removal of volatile components, such as water and diols at low temperatures. This technique is useful during reaction of the polytrimethylene ether glycol or the diol with the dicarboxylic acid equivalent, especially when it involves direct esterification, i.e., the dicarboxylic acid equivalent is a diacid. Other special polymerization techniques can be useful for preparation of specific polymers. Polymerization (polycondensation) can also be accomplished in the solid phase by heating divided solid product from the reaction of polytrimethylene ether glycol, a dicarboxylic acid equivalent, and ethylene glycol in a vacuum or in a stream of inert gas to remove liberated diol. This type of polycondensation is referred to herein as "solid phase polymerization" (or abbreviated "SPP").

Batch or continuous methods can be used for the processes described above or for any stage of polyether ester preparation. Continuous polymerization, by ester exchange, is preferred.

In preparing the polyether ester elastomers of this invention, it is sometimes desirable to incorporate known branching agents to increase melt strength. In such instances, a branching agent is typically used in a concentration of from about 0.00015 to about 0.005 equivalents per 100 grams of polymer. The branching agent can be a polyol having 3-6 hydroxyl groups, a polycarboxylic acid having 3 or 4 carboxyl groups, or a hydroxy acid having a total of 3-6 hydroxyl and carboxyl groups. Representative polyol branching agents include glycerol, sorbitol, pentaerytritol, 1,1,4,4-tetrakis(hydroxymethyl)cyclohexane, trimethylol propane, and 1,2,6-hexane triol. Suitable polycarboxylic acid branching agents include hemimellitic, trimellitic, trimesic pyromellitic, 1,1,2,2-ethanetetracarboxylic, 1,1,2-ethanetricarboxylic, 1,3,5-pentanetricarboxylic, 1,2,3,4-cyclopentanetetracarboxylic and like acids. Although the acids can be used as is, it is preferred to use them in the form of their lower alkyl esters.

Properties of the polyether ester will be influenced by varying the composition (dicarboxylic acid equivalent, ethylene glycol, polytrimethylene ether glycol, other diol, other glycol, etc.), the weight % of hard segment, and the mole ratio of hard segment to soft segment. Depending on amount of polytrimethylene ether glycol incorporated, a soft rubbery elastomer to a hard resin can be made. The preferred amount of polytrimethylene ether glycol for soft grade polymer is from about 60 to about 90%, for medium grade polymer is from about 30 to about 59% and for hard grade polymer is from about 1 to about 29%, by weight based on the weight of the polymer. The preferred molecular weight (Mn) of polytrimethylene ether glycol for soft polymer is from about 1500 to about 5000, for a medium grade polymer is from about 800 to about 2000, and a hard grade polymer is from about 250 to about 1200.

Nucleating Agent

The compositions of the invention include a nucleating agent to improve the crystallization rate of the polyether ester elastomer. Preferred nucleating agents for use in the invention are alkali metal (Group IA) or alkaline earth metal (Group IIA) salts of, for example, sulfinates, phosphinates, phosphates, sulfates, sulfonates, phosphates, hydroxides, aliphatic carboxylates and aromatic carboxylates. That is, the salts comprise an alkali metal (lithium, sodium, potassium, rubidium or cesium) or alkaline earth metal (magnesium, calcium, strontium, or barium) cation and an anion preferably selected from the group consisting of carboxylate, sulfinate, phosphinate, sulfate, sulfonate, phosphate, hydroxide, aliphatic carboxylate and aromatic carboxylate. Preferred metal cations are lithium, sodium, potassium and calcium. Preferred anions are phosphate, sulfate, aliphatic carboxylates such as acetate and propionate, and aromatic carboxylates such as benzoate acid, terephthalate, isophthalate and phthalate. Particularly preferred nucleating agents are trisodium phosphate and sodium acetate.

Preferably the nucleating agent is present at a level of from about 0.005 to about 2 wt %, and more preferably from about 0.01 to about 1 wt %, based on the weight of the polyethylene ester hard segment.

The nucleating agent can be introduced to the polyether ester in several ways. It can be added at any time during the synthesis of the polymer. That is, it can be added during the (trans)esterification and/or the polycondensation steps. It is also possible to mix the nucleating agent with the finished polyether ester while it is being processed in an extruder or other melt mixer. Preferably, the nucleating agent is added during the (trans)esterification stage. It may be added as a pure compound or as a masterbatch in the same or different polyether ester to which it is being added.

Crosslinkable Poly(meth)acrylate Rubber

The cross-linkable polymeric rubbers useful in the present invention are acrylate-type rubbers. Typically such rubbers are linear copolymers derived by the copolymerization of more than one acrylic acid ester or methacrylic acid ester or mixtures thereof, or are derived by the copolymerization of ethylene and one or more acrylic acid ester or methacrylic acid ester or mixtures thereof. Where the acrylate rubber contains a major amount of ethylene, the acrylate can be little as 6.5 mole %, but for optimally low compression set the acrylate should be above 20 mole %. For purposes of this invention, such poly(meth)acrylates and ethylene/(meth)acrylate copolymers do not require the presence of a functionalized termonomer. However, it is contemplated that the mere presence of small amounts of intentionally added functionalized comonomer for specific end use properties is within the scope of the present invention provided that such functionality does not deleteriously affect the cure rate achieved during dynamic cross-linking by free-radical initiation. Also, it is contemplated that for purposes of this invention certain polyperfluoroalkyl acrylate (FPA) type polymers based on monomers such as 1,1-dihydroperfluoro-n-butyl acrylate and fluorinated copolymers derived from vinylidene fluoride and hexafluoropropylene should be considered equivalent to the acrylate-type rubbers. More preferably the cross-linkable acrylate rubber is a copolymer of ethylene and one or more alkyl esters of acrylic acid, methacrylic acid or mixtures thereof wherein the relative amount of ethylene copolymerized with the acrylic acid esters (i.e., the alkyl acrylate) is less than 80 weight percent and the alkyl acrylate represents greater than 20 weight percent of the copolymer.

Copolymers of ethylene and an acrylate ester are well known. They can be manufactured using two high-pressure free radical processes: tubular processes or autoclave processes. The difference in ethylene/acrylate copolymers made from the two processes is described in, e.g., "High Flexibility EMA Made From High Pressure Tubular Process", *Annual Technical Conference—Society of Plastics Engineers* (2002), 60th (Vol. 2), 1832-1836.

Of note are copolymers of ethylene and methyl acrylate and copolymers of ethylene and butyl acrylate. Of particular note are copolymers of ethylene and methyl acrylate containing from about 25 wt % to about 40 wt % of methyl acrylate. Also of particular note are copolymers of ethylene and butyl acrylate containing from about 25 wt % to about 40 wt % of butyl acrylate. Especially noteworthy are such copolymers prepared by tubular processes. Tubular process ethylene/alkyl acrylate copolymers are commercially available under the tradename ELVALOY® AC (E. I. du Pont de Nemours and Company).

Also of note are copolymers (terpolymers) of ethylene, methyl acrylate, and a second alkyl acrylate (e.g., butyl acrylate). A particular embodiment provides a copolymer derived from copolymerization of ethylene, methyl acrylate comonomer, and n-butyl acrylate comonomer wherein the methyl acrylate comonomer is present in the copolymer from a lower limit of about 5 wt % to an upper limit which varies linearly from about 45 wt % when n-butyl acrylate is present at about 41 wt % to about 47.5 wt % when n-butyl acrylate is present at about 15 wt % and wherein the n-butyl acrylate is present in said copolymer from a lower limit of about 15 wt % when methyl acrylate is present within the range of about 23 to 47.5 wt % and from a lower limit of about 57 wt % when methyl acrylate is present at about 5 wt % and from lower limit that varies linearly between the lower limit at about 5 wt % of methyl acrylate and the lower limit of about 23 wt % of methyl acrylate to an upper limit of about 41 wt % when methyl acrylate is present at about 45 wt % and to an upper limit of about 80 wt % when methyl acrylate is present at about 5 wt % and to an upper limit that varies linearly between about 45 and 5 wt. % methyl acrylate, and the remainder is ethylene.

Similarly, in another embodiment methyl acrylate is present in the copolymer at about 10 to 40 wt % and n-butyl acrylate is present in the copolymer from a lower limit of about 15 wt %, when methyl acrylate is present within the range of about 23 to 40 wt %, and from a lower limit of about 47 wt %, when methyl acrylate is present at about 10 wt %, and from a lower limit that varies linearly between the lower limit at about 10 wt % methyl acrylate and the lower limit at about 23 wt % methyl acrylate to an upper limit of about 35 wt %, when methyl acrylate is present at about 40 wt % and to an upper limit of about 65 wt %, when methyl acrylate is present at about 10 wt %, and to an upper limit that varies linearly between about 40 and 10 wt % methyl acrylate.

Especially notable are terpolymers wherein methyl acrylate is present in the terpolymer at about 15 to 30 wt % and n-butyl acrylate is present in the copolymer from a lower limit of about 20 wt %, when methyl acrylate is present within the range of about 27 to 30 wt %, and from a lower limit of about 45 wt %, when methyl acrylate is present at about 15 wt %, and from a lower limit that varies linearly between the lower limit at about 15 wt % methyl acrylate and the lower limit at about 25 wt % methyl acrylate to an upper limit of about 45 wt %, when methyl acrylate is present at about 30 wt %, and to an upper limit of about 60 wt %, when methyl acrylate is present at about 15 wt %, and to an upper limit that varies linearly between about 30 and 15 wt % methyl acrylate. These terpolymers are described in more detail in US2005-0020775A1.

Alternatively, the cross-linkable acrylate rubber can comprise a mixture of two or more different ethylene/alkyl acrylate copolymers. A mixture of two or more ethylene/alkyl acrylate copolymers can be used in the present invention in place of a single copolymer as long as the average values for the comonomer content will be within the range indicated above. Particularly useful properties can be obtained when two properly selected ethylene/alkyl acrylate copolymers are used in blends of the present invention. For example, the cross-linkable acrylate rubber may comprise an ethylene/methyl acrylate copolymer mixed with an ethylene copolymer with a different alkyl acrylate (e.g. butyl acrylate). The different polyethylene/alkyl acrylate copolymers may both be prepared using autoclave processes, may both be prepared using tubular processes, or one may be prepared using an autoclave process and the other using a tubular process.

Crosslinking System

The compositions of this invention contain a crosslinking system to crosslink the rubber. The crosslinking system (and its components) is present in an amount effective crosslink the rubber. Preferably the crosslinking system is selected and is used in amounts sufficient to achieve slow rates of reaction and corresponding desirable high time at maximum G' rate (and can be quantified for the preferred embodiments as a time at maximum G' rate of equal to or greater than 3.9 minutes). G' rate is descried in US2004-0115450A1.

Preferably the crosslinking system comprises a peroxide free radical initiator in combination with an organic multiolefinic coagent. Preferably the crosslinking system comprises from about 0.1 to about 5 wt %, more preferably from about 1 to about 5 wt %, and still more preferably from about 1.5 to about 3 wt %, peroxide free radical initiator based on the weight of the rubber. Preferably the coagent is used in an amount of from about 0.5 to about 8 wt %, and more preferably from about 2 to about 6 wt %, by weight of the rubber.

Preferred free radical initiators for use in the invention decompose rapidly at the temperature of dynamic cross-linking but not at the melt temperature of mixing of the components. These include, for example, 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, α,α-bis (t-butylperoxy)-2,5-dimethylhexane, and the like. Most preferable free-radical initiators are 2,5-dimethyl-2,5-di-(t-butylperoxy) hexyne-3; 2,5-dimethyl-2,5-di-(t-butylperoxy) hexane; and t-butyl peroxybenzoate.

The organic multiolefinic co-agents are preferably organic dienes. The coagent can be, for example, diethylene glycol diacrylate, diethylene glycol dimethacrylate, N,N'-m-phenylene dimaleimide, triallylisocyanurate, trimethylolpropane trimethacrylate, tetraallyloxyethane, triallyl cyanurate, tetramethylene diacrylate, polyethylene glycol dimethacrylate, and the like. Preferably the co-agents are diethylene glycol diacrylate, diethylene glycol dimethacrylate, N,N'-m-phenylene dimaleimide, and triallylisocyanurate.

The actual mixing of components and subsequent dynamic crosslinking can be performed either in a batch mode or a continuous mode using conventional melt blending equipment as generally practiced in the art. Preferably, the process is performed continuously in a melt extruder or injection molding apparatus. The critical consideration is to perform the steps such that one takes advantage of the slow rate of cure at low temperatures, thus, achieving significant mixing and dispersion prior to crosslinking. In this manner the subsequent higher temperature will cross-link the rubber phase after a higher level of dispersion has been accomplished. Using these processes a variety of shaped or molded articles may be produced from the compositions of the invention.

Examples of such articles include, but are not restricted to, hoses, gaskets, films, belts, cable jackets, seals, gears and bearings.

The dynamically cross-linked thermoplastic elastomer compositions according to the present invention can be advantageously modified by the addition of various types of fillers, pigments, coloring agent, heat and UV stabilizers, antioxidants, mold release agents, branching agents and the like as generally known in the art. Preferably the melt processable thermoplastic elastomeric composition is stabilized with a combination of polyamide and antioxidant as taught in U.S. Pat. No. 3,896,078.

Examples of fillers include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, carbon black, carbon fiber and the like. The preferred filler is a carbon black. The amount of a filler should not impair the fluidity and mechanical strengths of the composition. The preferred amount of filler is in the range of from about 0.1 to about 10 wt % of total composition.

EXAMPLES

The following examples are presented for the purpose of illustrating the invention and are not intended to be limiting. All parts, percentages, etc., are by weight unless otherwise indicated.

The 1,3-propanediol utilized in the examples was prepared by biological methods described in US2005-0069997A1, and had a purity of >99.8%.

PO3G was prepared from the 1,3-propanediol as described in US2005-0020805A1.

Number-average molecular weights (Mn) were determined by end-group analysis using NMR spectroscopic methods.

Melting point (Tm), (re)crystallization temperature (Trc), glass transition temperature (Tg), and ΔH (the heat caused by the polymer crystallization) were determined in accordance with ASTM D-3418 (1988) using a DuPont DSC Instrument Model 2100 (E. I. du Pont de Nemours and Co., Wilmington, Del.). About 3 mg of sample was sealed in a DSC aluminum pan and the sample was heated to 270° C. under a nitrogen atmosphere and then cooled. The heating and cooling rates were 10° C. per minute.

Crystallization behavior of polyether ester elastomers was investigated by differential scanning calorimetry (DSC). The inherent viscosity (IV) of the polymer sample was analyzed on a PolyVISC® automated viscometer (Cannon Instrument Co.) at a temperature of 30° C. in m-cresol with a 0.5% concentration.

Preparation of Polyether Ester Elastomer (PE1)

This example describes synthesis of a polyether ester having 50 wt % polyethylene terephthalate hard segments and 50 wt % polytrimethylene ether terephthalate soft segments in the presence of trisodium phosphate nucleating agent A 25 gallon autoclave was charged with 36.5 lbs of dimethyl terephthalate, 30 lbs of PO3G (Mn of 1770), 16 lbs of ethylene glycol, 87 g of ETHANOX® 330 antioxidant, 12 g of TYZOR® TPT catalyst, 22 g trimethyl-trimellitate (1,2,4-benzene-tricarboxylic acid, methyl ester) and 150 g of sodium phosphate nucleating agent. The temperature was raised to 215° C. under nitrogen, and the methanol generated was removed as a liquid condensate by distillation. The temperature was held at 210° C. for about 1.5 hours until no more methanol evolved, indicating the end of transesterification reaction.

The temperature was then raised to 250° C. and held at that temperature at a pressure of 0.3 mmHg for 2.5 hours. The polymer was extruded into ribbons and converted into flakes.

The properties of the polymer are listed in Table 1.

Preparation of Comparative Polyether Ester Elastomer (CPE)

This comparative example describes the synthesis of a polyether ester having 55 wt % polyethylene terephthalate hard segment and 45 wt % polytrimethylene ether terephthalate soft segment. No nucleating agent was utilized.

A 250 ml three-necked flask was charged with 42.1 g of dimethyl terephthalate, 29.3 g of PO3G (Mn of 1770), 20 g of ethylene glycol, 0.15 g of IRGANOX® 1098 anti-oxidant (Ciba Specialty Chemicals Inc.), and 25 mg of TYZOR® TPT catalyst. The temperature was raised to 215° C. under nitrogen flush, and methanol generated was removed by distillation as a liquid condensate. The temperature was held at 210° C. for about 1.5 hours until no more methanol evolved indicating the end of transesterification reaction.

The temperature was then raised to 250° C. and held at that temperature at a pressure of 0.2 mm Hg for 2 hours. The reaction was ended by removing the heat and vacuum.

The properties of the polymer are listed in Table 1.

Preparation of Polyether Ester Elastomer (PE2)

This example illustrates the preparation of a polyether ester with the same stoichiometry as that of the Comparative Polyether Ester Elastomer (CPE), but including trisodium phosphate nucleating agent.

A 250 ml three-necked flask was charged with 42.1 g of dimethyl terephthalate, 29.3 g of PO3G (Mn of 1770), 20 g of ethylene glycol, 0.15 g of IRGANOX® 1098 anti-oxidant, 25 mg of TYZOR® TPT catalyst, and 0.36 g of trisodium phosphate (2100 ppm of sodium based on the final polymer) as nucleating agent. The temperature was raised to 215° C. under nitrogen, and the methanol generated was removed as a liquid condensate by distillation. The temperature was held at 210° C. for about 1.5 hours until no more methanol evolved, indicating the end of transesterification reaction.

The temperature was raised to 250° C. and held at that temperature at a pressure of 0.2 mm Hg for 2 hours. Then the reaction was stopped by removal of the heat and vacuum, and the polymer was collected.

The properties of the polymer are listed in Table 1.

TABLE 1

| Composition | | Nucleating Agent | Tm (° C.) | Trc (° C.) | ΔH (J/g) | $T_{1/2}$ at 215° C. (min) |
|---|---|---|---|---|---|---|
| PE1 | PET (50%)/ PO3GT (50%) | $Na_3PO_4$ (2100 ppm of Na) | 233.0 | 187 | 16.5 | 3.20 |
| CPE | PET (55%)/ PO3G (45%) | None | 244.6 | 174.1 | 24.4 | 8.18 |
| PE2 | PET (55%)/ PO3G (45%) | $Na_3PO_4$ (2100 ppm of Na) | 241.9 | 214.3 | 24.8 | 0.23 |

PET: Polyethylene terephthalate hard segment
PO3GT: PO3G terephthalate soft segment As can be seen, the polymer made without nucleating agent has significantly higher $t_{1/2}$ crystallization time and lower recrystallization onset temperature when compared to polymer of similar composition but with nucleating agent.

The following materials were utilized in the examples that follow:

HYTREL® 5556 thermoplastic polymer resin: a block copolymer consisting of a hard (crystalline) segment of polybutylene terephthalate and a soft (amorphous) segment based on long chain polyether glycols (from E. I. du Pont de Nemours and Company).

PAR1: an ethylene/62% methyl acrylate copolymer (glass transition temperature −29° C.).

PAR2: an ethylene/methyl acrylate/n-butyl acrylate/acid cure site copolymer (glass transition temperature −42° C.).

DEGDM: diethylene glycol dimethacrylate crosslinking coagent incorporated with elastomer.

DYBP: 2,5-dimethyl-2,5-di-(tert-butylperoxy), hexyne-3 crosslinking peroxide.

IRGANOX® 565: a multifunctional phenolic antioxidant (Ciba Specialty Chemicals).

IRGAFOS® 126: an organophosphite processing stabilizer (Ciba Specialty Chemicals).

HYTREL® 30HS: a commercially available heat stabilization additive for HYTREL® (E. I. duPont de Nemours and Company).

Test methods utilized in the following examples were ASTM D 2240 (Durometer Hardness) and ASTM D 1708 (Tensile Properties of Plastics by Use of Microtensile Specimens).

Examples 1 and 2 and Comparative Example 1

Blended compositions (Examples 1 and 2) were prepared from the polyether elastomer having 50 wt % polyethylene terephthalate hard segments and 50 wt % poly-trimethylene ether terephthalate soft segments in the presence of trisodium phosphate nucleating agent (PE1) using a continuous process on a twin screw extruder. For comparison (Comparative Example 1) a similar composition was prepared using HYTREL® 5556 as the continuous phase. Crosslinking chemicals (DEGDM and DYBP) were blended with elastomer (PAR1 or PAR2) at a low enough temperature (~100° C.) so that there was no reaction. The polyester continuous phase was then dispersed by extruder screw elements and the temperature gradually increased (to ~250° C.). During this dispersion of the two polymers and temperature increase, the elastomer was crosslinked and dispersed (dynamic vulcanization). The polyester became the continuous thermoplastic phase, and the elastomer became the crosslinked, dispersed phase. The resulting product had rubber-like physical properties, but could be molded and extruded like a thermoplastic.

Parts for physical testing were injection molded using barrel temperatures of 225 to 240° C. Plaques (⅛") for Shore A hardness and compression set evaluation, and ⅛" microtensile bars for tensile properties evaluation were utilized.

Compositions of Examples 1 and 2, and Comparative Example 1 are presented below in Table 2.

Table 3 shows tensile properties of the compositions at ambient temperature conditions. Table 4 contains values of the Shore A hardness and compression set properties. "Annealed" compression set values were determined on materials that were heat treated at 150° C. for 3 hours prior to compression set testing to more fully crystallize the polyester continuous phase.

TABLE 3

| EX | Stress @ Max Load Psi (Mpa) | Max Strain % | Stress @ 25% strain (psi) | Stress @ 50% strain (psi) | Stress @ 100% strain (psi) |
|---|---|---|---|---|---|
| C1 | 1112 (7.7) | 201 | 612 | 801 | 987 |
| 1 | 832 (5.7) | 201 | 368 | 522 | 674 |
| 2 | 927 (6.4) | 264 | 427 | 584 | 735 |

TABLE 4

| EX | Shore A Hardness | Annealed % Compn. Set Avg %, 100° C., 22 hrs. | As Molded Compn. Set Avg %, 100° C., 22 hrs. |
|---|---|---|---|
| C1 | 87 | 57 | 73 |
| 1 | 80 | 55 | 80 |
| 2 | 82 | 51 | 75 |

The data in Table 5 below show the percentage of physical properties (tensile stress @ break and strain @ break) that were retained after air oven heat aging for the specified number of hours. Examples 1 and 2 showed performance similar to that of compositions using HYTREL® 5556 as the continuous phase. Success in heat aging is usually indicated by retention of at least 50% of the original, as measured, percent strain after a given time and temperature in the air oven.

TABLE 5

| | % Retained Strain @ Break | | | |
|---|---|---|---|---|
| EX. | 168 hrs | 504 hrs | 1008 hrs | 3024 hrs |
| C1 | 102 | 98 | 94 | 57 |
| 1 | 87 | 84 | 68 | 30 |
| 2 | 95 | 110 | 95 | 54 |

Table 6 below contains tensile data at sub-ambient temperatures (0° C. and −40° C.) for Examples 1 and 2 and Comparative Example 1. The compositions of Examples 1 and 2 showed a significant advantage of retaining higher elasticity at sub-ambient temperature over Comparative Example 1, which is highly desirable for automotive end use.

TABLE 2

| EX | Elastomer (wt %) | DEGDM Wt % | DYBP Wt % | Cont. Phase | IRGANOX ® 565% | IRGAFOS ® 126% | HYTREL ® 30HS % |
|---|---|---|---|---|---|---|---|
| C1 | PAR1 45.5 wt % | 2.14 | 2 | 47.14% HYTREL ® 5556 | 0.19 | 0.29 | 5 |
| 1 | PAR2 40.48 wt % | 1.9 | 2.2 | 52.14% Ex. 1 | 0.19 | 0.29 | 5 |
| 2 | PAR1 40.48 wt % | 1.9 | 2 | 52.14% Ex. 1 | 0.19 | 0.29 | 5 |

In particular, the composition of Example 1 retained near 100% strain at break at −40° C. and showed the least increase in stress @ break at −40° C.

TABLE 6

| EX | Stress at Break, psi | | | Strain at Break, % | | |
|---|---|---|---|---|---|---|
|  | Ambient | 0° C. | −40° C. | Ambient | 0° C. | −40° C. |
| C1 | 1203 | 1468 | 6915 | 254 | 156 | 22 |
| 1 | 952 | 1441 | 4041 | 204 | 258 | 94 |
| 2 | 829 | 1526 | 5397 | 222 | 282 | 49 |

The invention claimed is:

1. A curable thermoplastic elastomeric composition comprising: (a) a polyether ester elastomer having a polytrimethylene ether ester soft segment and a polyethylene ester hard segment; (b) a nucleating agent selected from the group consisting of an alkali metal salt, an alkaline earth metal salt and mixtures thereof; (c) a crosslinkable poly(meth)acrylate rubber; and (d) a crosslinking system to crosslink the rubber.

2. The curable thermoplastic elastomeric composition of claim 1, comprising from about 15 to about 75 wt % polytrimethylene ether ester elastomer and from about 25 to about 85 wt % poly(meth)acrylate rubber, based on the combined weight of the elastomer and the rubber.

3. The curable thermoplastic elastomeric composition of claim 1, wherein the polyether ester elastomer comprises from about 10 to about 90 wt % polytrimethylene ether ester soft segment, and from about 10 to about 90 wt % polyethylene ester hard segment, based on the weight of the polyether ester elastomer.

4. The curable thermoplastic elastomeric composition of claim 1, wherein the polyether ester elastomer preferably has an inherent viscosity of at least about 0.6 dl/g, and up to about 2.4 dl/g.

5. The curable thermoplastic elastomeric composition of claim 1, wherein the poly-trimethylene ether ester soft segment is the reaction product of a polymeric ether glycol and a dicarboxylic acid equivalent, via ester linkage, wherein at least about 50 wt % of the polymeric ether glycol used to form the soft segment is a polytrimethylene ether glycol.

6. The curable thermoplastic elastomeric composition of claim 5, wherein the poly-trimethylene ether glycol is an oligomic and/or polymeric ether glycol in which at least 50% of the repeating units are trimethylene ether units.

7. The curable thermoplastic elastomeric composition of claim 6, wherein the poly-trimethylene ether glycol is prepared by the acid catalyzed polycondensation of monomers comprising at least 50 mole % 1,3-propane diol.

8. The curable thermoplastic elastomeric composition of claim 7, wherein the 1,3-propane diol is derived from a fermentation process using a renewable biological source.

9. The curable thermoplastic elastomeric composition of claim 5, wherein the di-carboxylic acid equivalent is selected from the group consisting of terephthalic acid, dimethyl terephthalate and mixtures thereof.

10. The curable thermoplastic elastomeric composition of claim 6, wherein the poly-trimethylene ether glycol has number average molecular weight of from about 250 to about 5000.

11. The curable thermoplastic elastomeric composition of claim 1, wherein the poly-ethylene ester hard segment is the reaction product of one or more diols and one or more dicarboxylic acid equivalents, via ester linkage, wherein greater than about 50 mole % of the diol used to form the hard segment is ethylene glycol.

12. The curable thermoplastic elastomeric composition of claim 11, wherein the di-carboxylic acid equivalent is selected from the group consisting of terephthalic acid, dimethyl terephthalate and mixtures thereof.

13. The curable thermoplastic elastomeric composition of claim 1, wherein the nucleating agent is present at a level of from about 0.005 to about 2 wt %, based on the weight of the polyethylene ester hard segment.

14. The curable thermoplastic elastomeric composition of claim 1, wherein the nucleating agent comprises a metal cation selected from the group consisting of lithium, sodium, potassium and calcium, and a anion selected from the group consisting of phosphate, sulfate and carboxylate.

15. The curable thermoplastic elastomeric composition of claim 1, wherein the crosslinkable poly(meth)acrylate rubber is selected from the group consisting of poly alkyl (meth)acrylate rubber, ethylene/alkyl (meth)acrylate copolymer rubber and poly-perfluoroalkylacrylate rubber.

16. The curable thermoplastic elastomeric composition of claim 1, wherein the crosslinking system comprises a peroxide free radical initiator in combination with an organic multi-olefinic coagent.

17. A melt processable thermoplastic elastomeric composition comprising:
    (a) a continuous phase comprising: (i) polyether ester elastomer having a poly-trimethylene ether ester soft segment and a polyethylene ester hard segment, and (ii) a nucleating agent; and
    (b) a crosslinked poly(meth)acrylate rubber disperse phase.

18. A shaped article comprising the melt processable thermoplastic elastomeric composition of claim 17.

19. A process for manufacturing a melt processable thermoplastic elastomeric composition comprising the steps of:
    (a) providing a cross-linkable poly(meth)acrylate rubber, a crosslinking system in an amount effective to crosslink the poly(meth)acrylate rubber, a polyether ester elastomer having a polytrimethylene ether ester soft segment and a polyethylene ester hard segment, and a nucleating agent in an amount effective to lower the crystallization time of the polyether ester elastomer;
    (b) forming a mixture of the cross-linkable poly(meth)acrylate rubber, the polyether ester elastomer, the nucleating agent and the crosslinking system;
    (c) cross-linking the cross-linkable poly(meth)acrylate rubber in the mixture using the crosslinking system; and
    (d) recovering the melt processable thermoplastic elastomeric composition comprising the polyether ester elastomer and nucleating agent as a continuous phase and the crosslinked poly(meth)acrylate rubber as a disperse phase.

20. The process of claim 19, wherein the crosslinking is carried during extrusion or injection molding of the melt processable thermoplastic elastomeric composition.

* * * * *